(12) United States Patent
Ise

(10) Patent No.: US 11,637,960 B2
(45) Date of Patent: Apr. 25, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yasuaki Ise, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 170 days.

(21) Appl. No.: 16/946,037

(22) Filed: Jun. 3, 2020

(65) Prior Publication Data
US 2020/0389579 A1     Dec. 10, 2020

(30) Foreign Application Priority Data
Jun. 10, 2019   (JP) .............................. JP2019-108226

(51) Int. Cl.
*H04N 5/235*     (2006.01)
*H04N 5/225*     (2006.01)
(Continued)

(52) U.S. Cl.
CPC ......... *H04N 5/2351* (2013.01); *G06T 7/0002* (2013.01); *H04N 5/2256* (2013.01); *H04N 5/2354* (2013.01); *H04N 5/30* (2013.01); *G06T 2207/10004* (2013.01); *G06T 2207/20212* (2013.01)

(58) Field of Classification Search
CPC .. H04N 5/2351; H04N 5/2256; H04N 5/2354; H04N 5/30; H04N 5/23232; H04N 5/332; H04N 9/77; G06T 7/0002; G06T 2207/10004; G06T 2207/20212;
(Continued)

(56) References Cited

U.S. PATENT DOCUMENTS 10,691,012 B2    6/2020   Ise
2010/0309315 A1  12/2010  Hogasten
(Continued)

FOREIGN PATENT DOCUMENTS

JP    2014135627 A    7/2014
JP    2016-201722 A   12/2016
JP    2017-005484 A    1/2017

OTHER PUBLICATIONS

Japanese Office Action issued in corresponding JP Patent Application No. 2019-108226, dated Mar. 6, 2023, with English translation.

*Primary Examiner* — Yogesh K Aggarwal
(74) *Attorney, Agent, or Firm* — Carter, DeLuca & Farrell LLP

(57) ABSTRACT

There is provided with an image processing apparatus. An obtaining unit obtains a visible light image and an invisible light image of an imaging region. A first evaluation unit evaluates a brightness of the imaging region. A second evaluation unit evaluates noise in an object in the imaging region. A combining unit generates a combined image by combining the visible light image and the invisible light image. An output unit outputs either the combined image or the invisible light image in accordance with an evaluation result on the noise without outputting the visible light image in response to the brightness becoming lower than a first threshold during an operation of outputting the visible light image.

18 Claims, 7 Drawing Sheets

(51) Int. Cl.
*G06T 7/00* (2017.01)
*H04N 5/30* (2006.01)

(58) Field of Classification Search
CPC ............. G06T 5/50; G06T 2207/10024; G06T 2207/10048; G06T 2207/20221
See application file for complete search history.

(56) References Cited

U.S. PATENT DOCUMENTS

2019/0373155 A1* 12/2019 Sasaki .................... H04N 5/332
2020/0234412 A1   7/2020 Ise

* cited by examiner

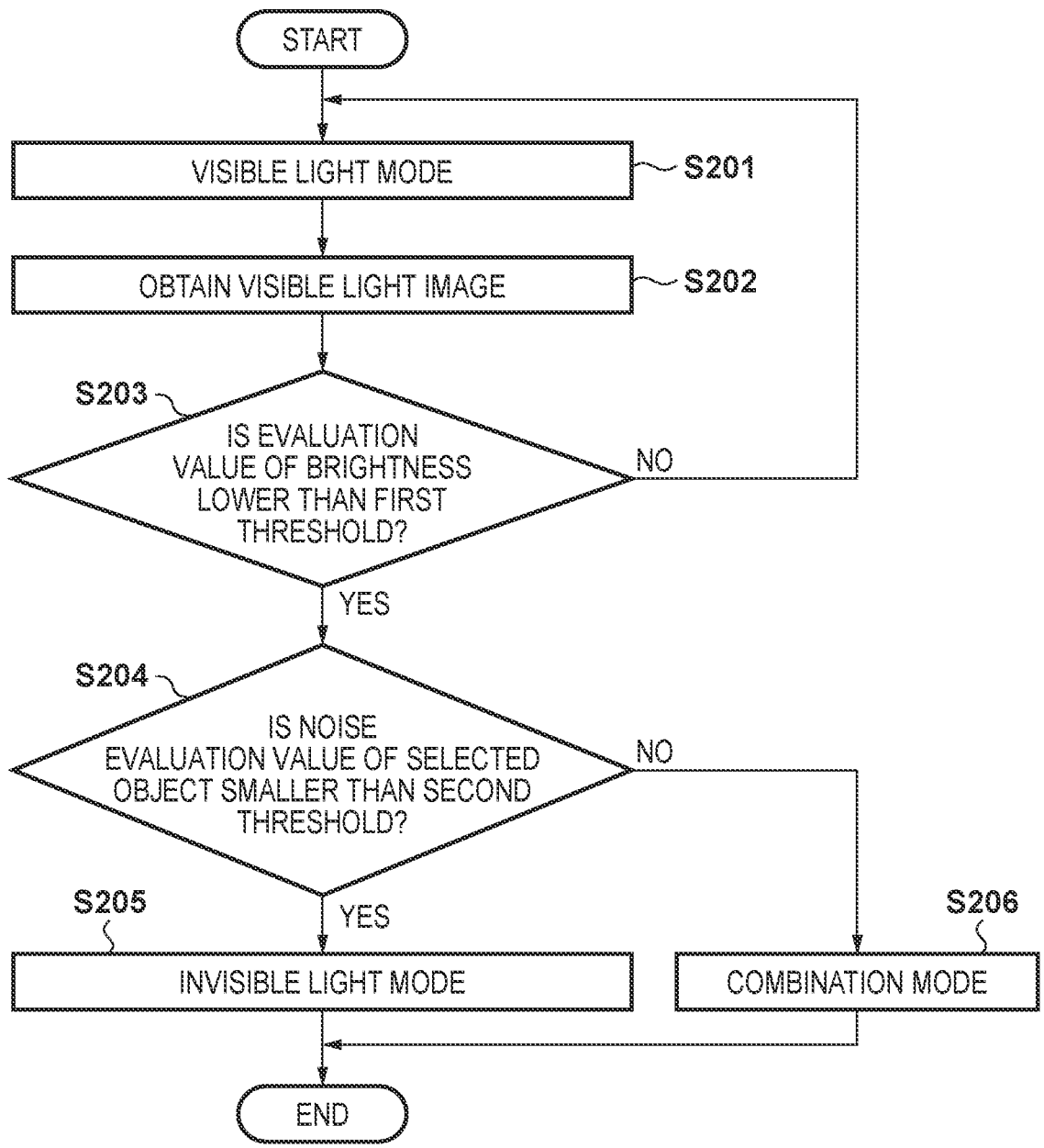

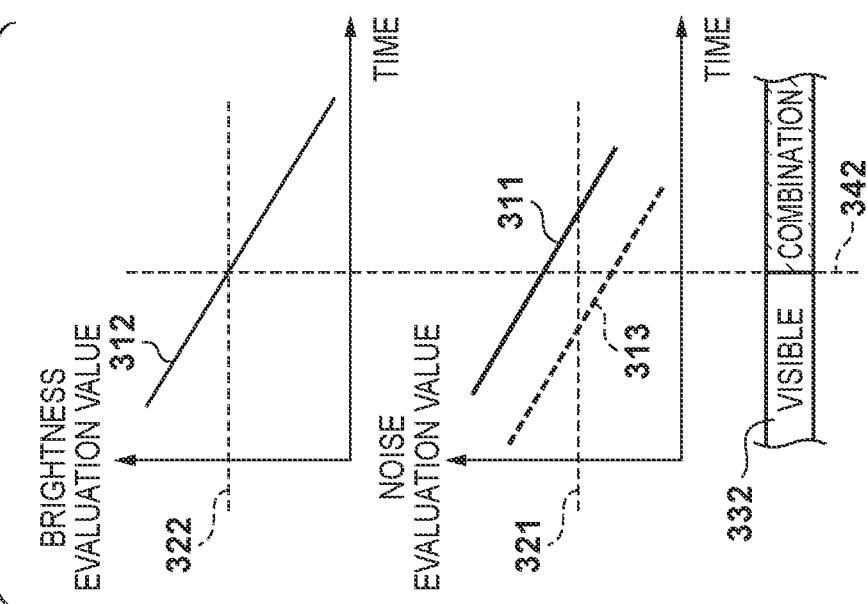
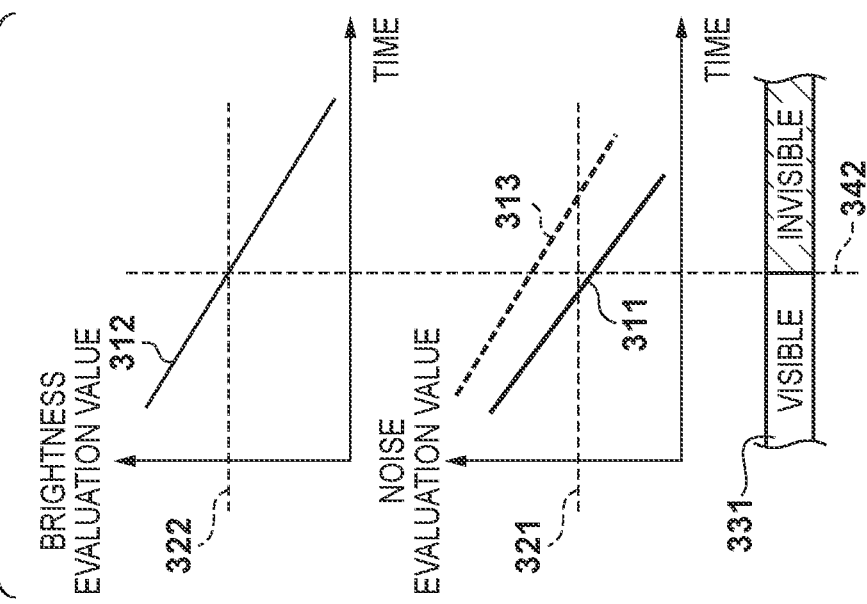
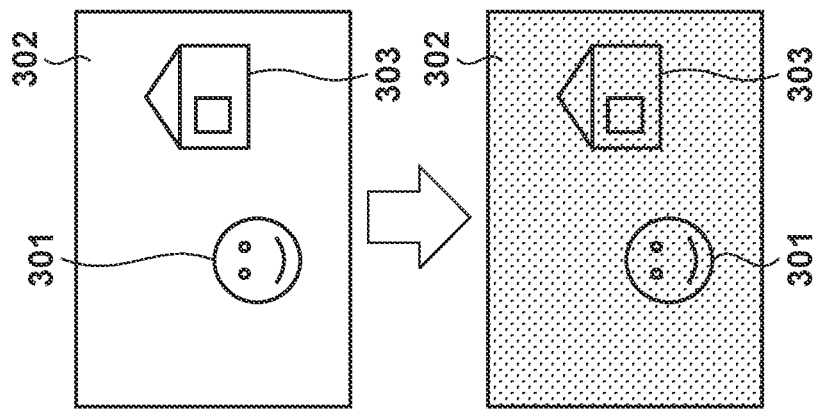

FIG. 5C
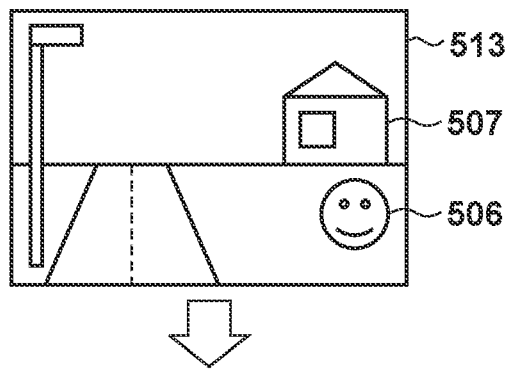
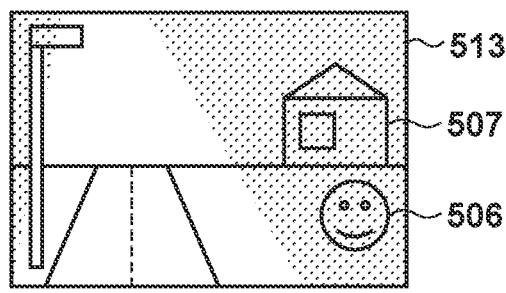
FIG. 5D
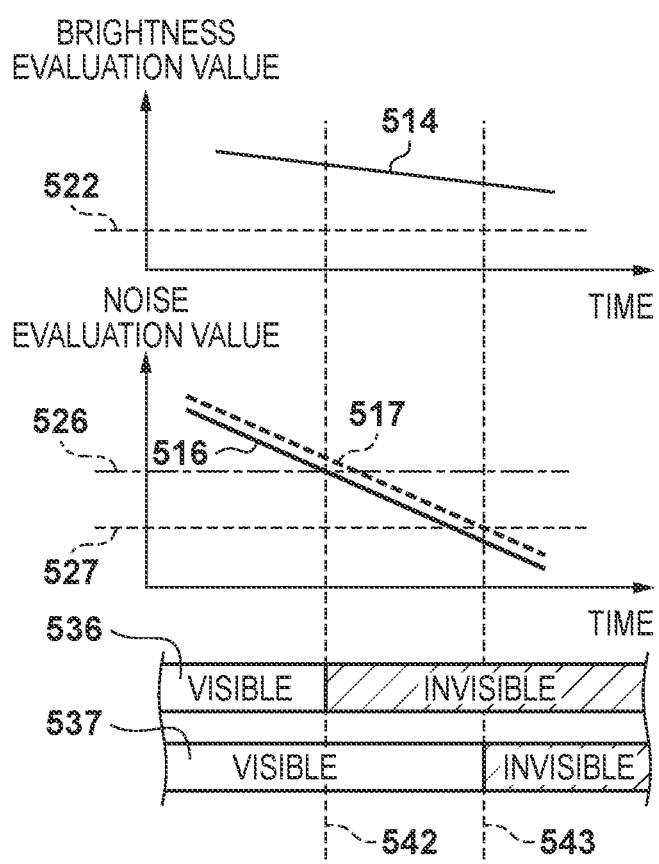

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium and, more particularly, to an imaging technique using visible light and invisible light.

Description of the Related Art

There is known an imaging apparatus that captures a color image even in a low-illuminance environment by capturing a visible light image and an invisible light image and combining them. When an imaging apparatus is to be used for monitoring, in particular, it is generally desired to reproduce the color of an object in a low-illuminance environment. For example, Japanese Patent Laid-Open No. 2014-135627 discloses a technique of generating a combined color image by combining a visible light image and an invisible light image upon performing amplification processing and noise removal processing for chrominance signals in accordance with the luminance signal of the visible light image.

SUMMARY OF THE INVENTION

According to an embodiment of the present invention, an image processing apparatus comprises: an obtaining unit configured to obtain a visible light image and an invisible light image of an imaging region; a first evaluation unit configured to evaluate a brightness of the imaging region; a second evaluation unit configured to evaluate noise in an object in the imaging region; a combining unit configured to generate a combined image by combining the visible light image and the invisible light image; and an output unit configured to output either the combined image or the invisible light image in accordance with an evaluation result on the noise without outputting the visible light image in response to the brightness becoming lower than a first threshold during an operation of outputting the visible light image.

According to another embodiment of the present invention, an image processing method comprises: obtaining a visible light image and an invisible light image of an imaging region; evaluating a brightness of the imaging region; evaluating noise in an object in the imaging region; generating a combined image by combining the visible light image and the invisible light image; and outputting either the combined image or the invisible light image in accordance with an evaluation result on the noise without outputting the visible light image in response to the brightness becoming lower than a first threshold during an operation of outputting the visible light image.

According to still another embodiment of the present invention, a non-transitory computer-readable medium stores a program which, when executed by a computer comprising a processor and a memory, causes the computer to perform: obtaining a visible light image and an invisible light image of an imaging region; evaluating a brightness of the imaging region; evaluating noise in an object in the imaging region; generating a combined image by combining the visible light image and the invisible light image; and outputting either the combined image or the invisible light image in accordance with an evaluation result on the noise without outputting the visible light image in response to the brightness becoming lower than a first threshold during an operation of outputting the visible light image.

Further features of the present invention will become apparent from the following description of exemplary embodiments (with reference to the attached drawings).

BRIEF DESCRIPTION OF THE DRAWINGS

FIG. 2 is a flowchart showing an example of operation mode changing processing;

FIGS. 3A to 3C are schematic views for explaining the operation mode changing processing;

FIGS. 5A to 5D are schematic views for explaining the operation mode changing processing.

DESCRIPTION OF THE EMBODIMENTS

Figure 1A:
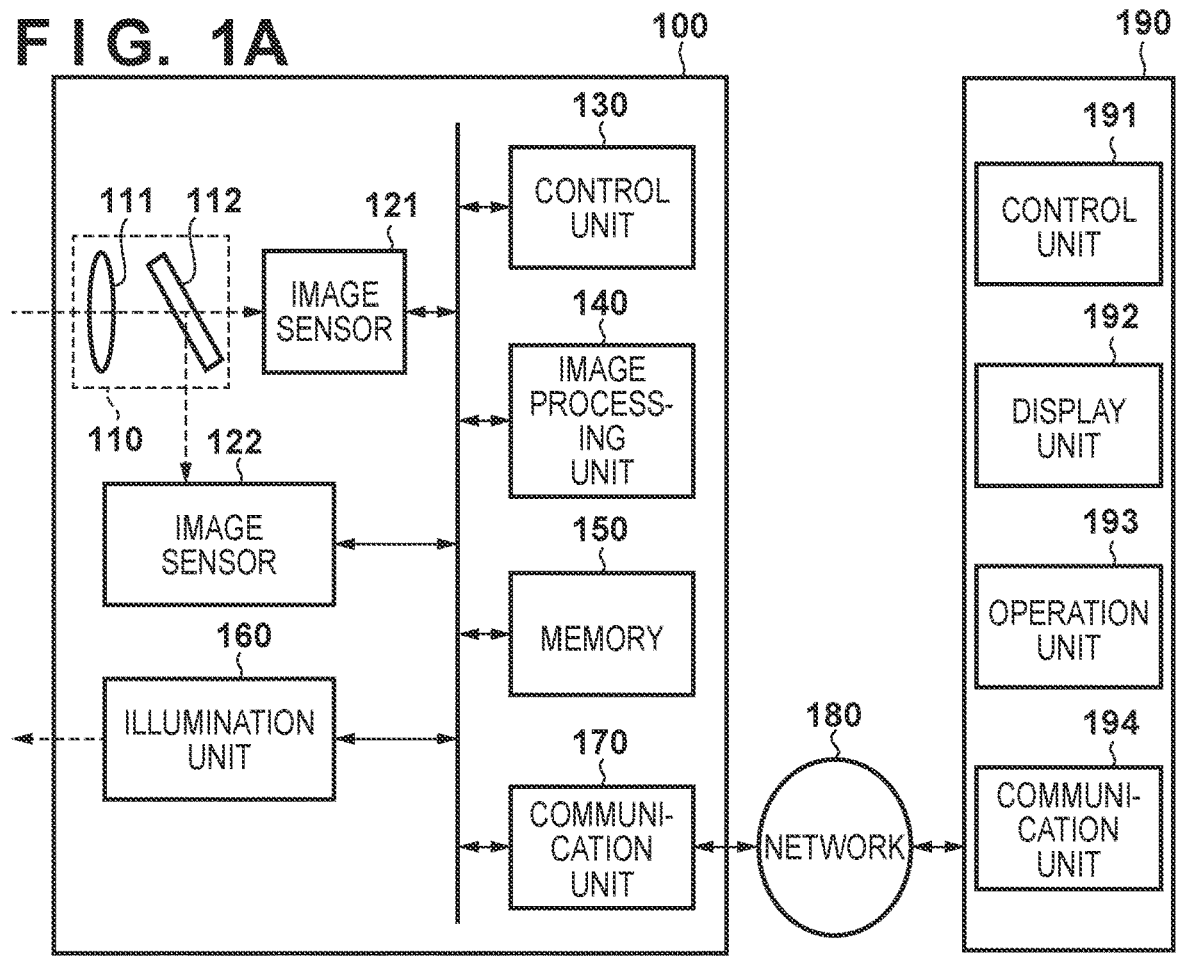
FIGS. 1A and 1B are flowcharts showing an example of operation mode changing processing.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

As disclosed in Japanese Patent Laid-Open No. 2014-135627, the combined image obtained by combining a visible light image and an invisible light image is greatly influenced by noise in the visible light image. For this reason, in a low-illuminance environment, in particular, although a combined color image is obtained, much noise occurs in the combined image. Outputting an image containing much noise will lead to deterioration in the recognizability of the object in the image.

One embodiment of the present invention can improve the recognizability of an object in an output image in an arrangement capable of generating a combined image by using a visible light image and an invisible light image.

An image processing apparatus according to one embodiment of the present invention will be described with reference to FIGS. 1A and 1B. FIG. 1A is a schematic view showing the functional arrangement of an imaging apparatus 100 as an image processing apparatus according to one embodiment of the present invention together with a client apparatus 190. The imaging apparatus 100 includes an optical unit 110 and two image sensors 121 and 122, which serve to obtain a visible light image and an invisible light image. On the other hand, the image processing apparatus need not always have an arrangement for capturing images. An image processing apparatus according to another embodiment of the present invention can obtain a visible light image and an invisible light image of an imaging region. Such an image processing apparatus can generate a combined image by using a control unit 130 and an image processing unit 140, which will be described later, and output a visible light image and an invisible light image or the combined image. An image processing apparatus according to one embodiment of the present invention may be constituted by a plurality of information processing apparatuses connected to each other via, for example, a network.

The imaging apparatus 100 includes the image sensor 121 for capturing a visible light image of an imaging region as an imaging target and the image sensor 122 for capturing an invisible light image of the imaging region. The image sensor 121 can, for example, receive visible light and generate an image signal of a visible light image. In addition, the image sensor 121 can, for example, receive invisible light such as infrared light and generate an image signal of an invisible light image. The image sensors 121 and 122 may be, for example, CMOS sensors, and can convert object images formed on imaging planes into electrical signals and output them. The image signals as the electrical signals output from the image sensors 121 and 122 are input to the image processing unit 140.

The optical unit 110 guides light from an imaging region to the image sensors 121 and 122. The optical unit 110 can include optical mechanisms 111 and 112. The optical mechanism 111 can include, for example, a control mechanism for zooming, focusing, stopping, camera shake correction, and the like and a lens group. The optical mechanism 112 separates light entering the image sensor 121 and light entering the image sensor 122. The optical mechanism 112 may be, for example, a prism for wavelength separation or a dichroic mirror. According to one embodiment, the optical mechanism 112 is a dichroic mirror and configured to transmit visible light and reflect infrared light. The visible light component transmitted through the dichroic mirror is received by the image sensor 121 arranged behind the dichroic mirror. The infrared light component reflected by the dichroic mirror is received by the image sensor 122.

Each of the image sensors 121 and 122 is connected to the control unit 130 and the image processing unit 140. The image sensors 121 and 122 are controlled by, for example, the control unit 130 and can perform imaging in synchronism with each other.

The control unit 130 controls the overall operation of the imaging apparatus 100. The control unit 130 may generate compressed image data by compressing image data. For example, the control unit 130 can compress a visible light image, invisible light image, or combined image. The control unit 130 can perform still image compression and moving image compression. Examples of image compression schemes include standards such as H.264, H.265, MPEG, and JPEG. In addition, the control unit 130 may generate image data in an arbitrary format including the mp4 and the avi format.

The control unit 130 can output image data or compressed image data like that described above. That is, the control unit 130 can output a visible light image and an invisible light image, a combined image, or compressed images of them. For example, the control unit 130 can store image data in a storage medium inside or outside the imaging apparatus 100 by outputting the image data. More specifically, the control unit 130 can record (compressed) image data in a memory 150, recording medium (not show), or the like mounted in the imaging apparatus 100. The control unit 130 can distribute (compressed) image data by transmitting the data to the client apparatus 190 as an information processing apparatus outside the imaging apparatus 100 via a communication unit 170 or a network 180.

The image processing unit 140 can process the visible light image and the invisible light image respectively captured by the image sensors 121 and 122. For example, the image processing unit 140 generates a visible light image and an invisible light image by performing image processing such as pixel interpolation processing or color conversion processing for the image signals obtained from the image sensors 121 and 122. The image processing unit 140 may perform correction processing such as pixel defect correction or lens correction or detection processing for performing black level, focus, or exposure adjustment. The image processing unit 140 may perform demosaic processing, white balance processing, gamma correction processing, edge enhancement processing, noise suppression processing, or the like. In the following case, an invisible light image is an infrared image generated by causing the image sensor 122 to receive an infrared light component. However, invisible light images are not limited to infrared images. The image processing unit 140 can save visible light images and invisible light images having undergone such image processing in the memory 150.

The image processing unit 140 generates a combined image by combining a visible light image and an invisible light image. That is, the image processing unit 140 can generate a combined image corresponding to one frame by using the visible light image and the invisible light image synchronously captured by the image sensors 121 and 122. In this specification, "one frame" indicates a one-frame visible light image or invisible light image, which is synchronously captured in this manner, or a combined image obtained from them.

The memory 150 can store programs or data. The memory 150 may include a nonvolatile memory and a RAM. The nonvolatile memory can store control programs defining processing procedures by the control unit 130 or various types of parameters used for processing by the control unit 130. The RAM can be used as a work area for the control unit 130 and can also be used as a storage area in which the image processing unit 140 performs image processing.

An illumination unit 160 can irradiate an imaging region with invisible light. The illumination unit 160 may include, for example, an invisible light device such as an LED light source that emits infrared light. It is possible to obtain an infrared image having high luminance by irradiation with invisible light by the illumination unit 160 even in a low-illuminance environment in which a visible light image having sufficient luminance cannot be obtained.

The communication unit 170 is a network processing circuit. The communication unit 170 can convert, for example, (compressed) image data into a communication signal complying with a communication protocol and transmit the signal to the network 180.

The client apparatus 190 is connected to the imaging apparatus 100 via the network 180, and can communicate with the imaging apparatus 100. The client apparatus 190 may be, for example, an information processing apparatus such as a personal computer. The client apparatus 190 includes a control unit 191, a display unit 192, an operation unit 193, and a communication unit 194.

The control unit 191 can receive combined image data from the imaging apparatus 100 and perform decompression processing as needed. The control unit 191 can control the operation of the imaging apparatus 100 by transmitting control information for controlling the imaging apparatus 100 to the imaging apparatus 100 via the communication unit 194. The display unit 192 can receive image data (for example, a visible light image, invisible light image, or combined image) distributed by the imaging apparatus 100 via the communication unit 194. The display unit 192 can also display an image or the like received from a UI (User Interface) or the imaging apparatus 100 for the user of the client apparatus 190. The operation unit 193 accepts an operation input from the user. Operating a mouse, keyboard, or the like in accordance with a UI (User Interface) such as icons displayed on the display unit 192 enables the user to perform an input operation for controlling the imaging apparatus 100 or the client apparatus 190. The communication unit 194 is a network processing circuit and can communicate with the imaging apparatus 100 via the network 180.

Each unit of the imaging apparatus 100 and the client apparatus 190 may be implemented by dedicated hardware or software. In the embodiment described below, the control unit 130, the image processing unit 140, and the control unit 191 are implemented by software. For example, a processor like a CPU executes programs stored in a storage medium like the memory 150 to implement the functions of the control unit 130, the image processing unit 140, and the control unit 191.

Figure 1B:
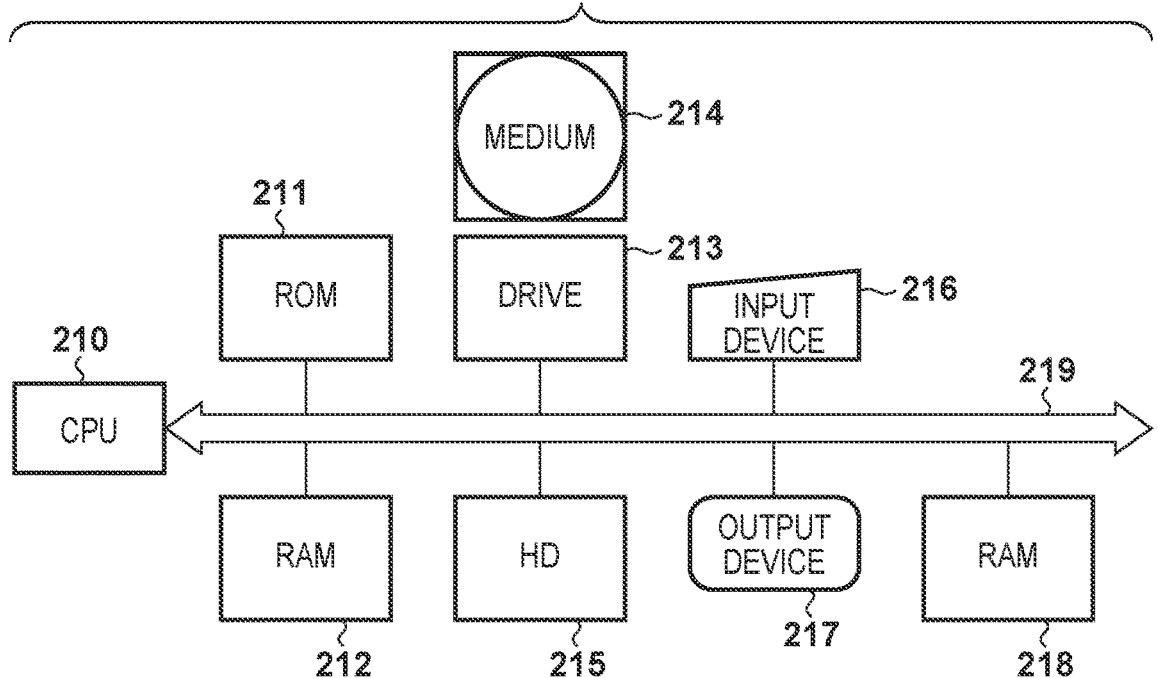

FIG. 1B is a block diagram showing an example of a hardware arrangement for implementing the functions of the control unit 130, the image processing unit 140, the control unit 191, and the like of the imaging apparatus 100 and the client apparatus 190. A CPU 210 as a processor implements processing corresponding to this embodiment by executing an OS (Operating System) and control programs or processing programs or the like stored in an HD (Hard Disk) 215. The CPU 210 can also control data transmission/reception to/from an external apparatus via an I/F (Interface) 218.

A ROM 211 stores various types of data such as basic I/O programs and application programs for executing predetermined processing. A RAM 212 can temporarily store various types of data and function as a main memory or work area for the CPU 210. A drive 213 can access a medium (recording medium) 214 and load, for example, programs and the like stored in the medium into the system shown in FIG. 1B. The HD 215 is a large-capacity memory and, for example, a hard disk. The HD 215 can store application programs, OS, control programs, or related programs. The system shown in FIG. 1B may include a nonvolatile storage device such as a flash memory instead of the HD 215. The ROM 211, the RAM 212, the HD 215, and the like each can function as the memory 150 shown in FIG. 1A.

An input device 216 obtains a user input to the imaging apparatus 100 or the client apparatus 190. The input device 216 may be, for example, a keyboard, pointing device (mouse or the like), or touch panel, and corresponds to the operation unit 193 shown in FIG. 1A. An output device 217 can output a command input from the input device 216 and a response to the command from the imaging apparatus 100 or the client apparatus 190. The output device 217 may be, for example, a display, loudspeaker, or headphone terminal, and corresponds to the display unit 192 shown in FIG. 1A.

The I/F (Interface) 218 intermediates the exchange of data between the imaging apparatus 100 or the client apparatus 190 and an external apparatus. The I/F 218 can include, for example, a wireless communication module. This wireless communication module can include known circuits such as an antenna system, RF transceiver, one or more amplifiers, tuner, one or more oscillators, digital signal processor, CODEC chip set, subscriber identification module card, and memory. The I/F 218 can also include a wired communication module for wired connection. This wired communication module enables the imaging apparatus 100 or the client apparatus 190 to communicate with other devices via one or more external ports. This external port is connected to another device directly or indirectly via a network in accordance with a standard such as Ethernet®, USB, or IEEE1394. The I/F 218 can include various types of software components that process data. Note that the I/F 218 can be implemented by using software that implements a function similar to that described above. The I/F 218 can function as the communication unit 170 or the communication unit 194 shown in FIG. 1A. A system bus 219 controls the flow of data in the system shown in FIG. 1B.

As described above, the image processing unit 140 generates a combined image by forming a visible light image and an invisible light image. For example, the image processing unit 140 can generate a combined image by combining the luminance information of each pixel of an invisible light image with the chrominance information of each pixel of a visible light image. Although the method of generating a combined image is not specifically limited, the following is an example. An image combining unit (not shown) of the image processing unit 140 can perform the following image combining processing.

The image processing unit 140 generates image data of a visible light image having luminance color difference signals (YCbCr) by performing color space conversion processing for the image signal of the visible light image output from the image sensor 121, and saves the image data in the memory 150. The image processing unit 140 also generates image data of a grayscale invisible light image having only a luminance signal (Yir) by using the image signal of the infrared image output from the image sensor 122, and saves the image data in the memory 150.

The image processing unit 140 generates a combined image by combining a visible light image and an invisible light image. The image processing unit 140 can combine the visible light image and the invisible light image according to equations (1) given below. In equations (1), Ys and Cbs/Crs are respectively the luminance signal and the color difference signals of the combined image, Y and Cb/Cr are respectively the luminance signal and the color difference signals of the visible light image, Yir is the luminance signal of the invisible light image, and α and β are coefficients.

$$Ys = \alpha Y + \beta Yir$$

$$Cbs = \alpha Cb$$

$$Crs = \alpha Cr \quad (1)$$

The image processing unit 140 can sequentially combine visible light images and invisible light images saved in the memory 150 for each frame. The image processing unit 140 can also save the generated combined images in the memory 150 again. In the case using equations (1), the image processing unit 140 can combine a visible light image and an invisible light image upon performing image processing for each image so as to match the position of the same object in the visible light image with that in the invisible light image based on combination parameters. These combination parameters can include parameters for performing deformation processing such as enlargement, reduction, or distortion correction of each image data or parameters for performing cutting processing from each image data. Combination parameters may be calculated in advance based on the arrangement relationship between the optical unit 110 and the image sensors 121 and 122 and stored in the memory 150. Alternatively, the imaging apparatus 100 that does not require the alignment of an object may be implemented by controlling the arrangement of the optical unit 110 and the image sensors 121 and 122.

The operation of the control unit 130 that outputs a visible light image, invisible light image, or combined image will be described next. In this embodiment, the image to be output is changed in accordance with the brightness of an imaging region and noise in the object in the imaging region. More specifically, when the brightness of a visible light image decreases below a first threshold while being output, the control unit 130 performs control to output a combined image or invisible light image without outputting a visible light image in accordance with a noise evaluation result. For example, the control unit 130 can perform control to shift the operation of outputting a visible light image to the operation of selecting and outputting a combined image or invisible light image in accordance with a noise evaluation result, in accordance with a decrease in brightness below the first threshold during the operation of outputting a visible light image.

If, for example, the illuminance of a surrounding environment is sufficiently high, the imaging apparatus 100 can capture and output a visible light image (distribute it to, for example, the client apparatus 190). In contrast to this, when the illuminance of the surrounding environment decreases, the S/N ratio (signal to noise ratio) of the visible light image decreases, resulting in a decrease in the recognizability of the visible light image. In such a low-illuminance environment, the imaging apparatus 100 can capture an invisible light image and use the invisible light image for an image outputting operation. That is, the control unit 130 can generate and output a combined image including chrominance information by combining a visible light image and an invisible light image.

It is, however, not easy to obtain chrominance information from a visible light image having undergone such a reduction in S/N ratio. Assume that the visible light image having undergone such a reduction in S/N ratio is combined with the invisible light image. In this case, although a combined image including chrominance information can be output, the influence of noise in the visible light image can reduce the recognizability of the combined image. For example, the client apparatus 190 may perform analysis processing for the output combined image. At this time, analysis accuracy may be improved more by using an image with a small amount of noise than by using a color image. When using, for example, the processing of detecting an object from an image, it is possible to improve detection accuracy by performing detection processing for an image with a small amount of noise. In such a case, the accuracy of the analysis result obtained by performing analysis processing for an invisible light image with which no visible light image is combined may be higher than that of the analysis result obtained by performing analysis processing for a combined image with which a visible light image is combined.

Accordingly, in this embodiment, the control unit 130 selects and outputs a combined image or invisible light image in a low-illuminance environment in accordance with a noise evaluation result. That is, the control unit 130 can output an invisible light image instead of a combined image in order to improve the recognizability of an image to be output. For example, the control unit 130 can perform control to selectively output a combined image or invisible light image in accordance with the amount of noise in the object selected by the user.

This embodiment is configured to switch among the operation of outputting a visible light image, the operation of outputting a combined image, and the operation of outputting an invisible light image. The mode in which the control unit 130 performs the operation of outputting a visible light image will be referred to as a visible light mode hereinafter. The mode in which the control unit 130 performs the operation of outputting a combined image will be referred to as a combination mode hereinafter. The mode in which the control unit 130 performs the operation of outputting an invisible light image will be referred to as an invisible light mode hereinafter. Outputting a visible light image, invisible light image, or combined image in this manner makes it possible to reduce the storage capacity required to store images or the band required to distribute images as compared with the case in which two or more of these images are simultaneously output. Another operation mode may also be used.

A mode changing method according to this embodiment will be described next with reference to FIGS. 2 and 3. In the embodiment, when the brightness of an imaging region becomes lower than a first threshold during the visible light mode, the control unit 130 shifts from the visible light mode to the combination mode or invisible light mode. In the following case, in particular, when a noise evaluation value concerning an object is equal to or more than a second threshold, the imaging apparatus 100 outputs a combined image without outputting any visible light image. That is, the imaging apparatus 100 can shift from the visible light mode to the combination mode. When a noise evaluation value concerning an object is less than the second threshold, the imaging apparatus 100 outputs an invisible light image without outputting any visible light image. That is, the imaging apparatus 100 can shift from the visible light mode to the invisible light mode.

FIG. 2 is a flowchart showing a mode changing method according to this embodiment. In step S201, the imaging apparatus 100 starts in the visible light mode. In step S202, the imaging apparatus 100 starts capturing a visible light image and an invisible light image.

In step S203, the control unit 130 evaluates the brightness of the imaging region. The first evaluation unit (not shown) of the control unit 130 may perform this processing. The brightness evaluation method is not specifically limited. The control unit 130 may evaluate the brightness of the imaging region based on a visible light image. For example, the control unit 130 can evaluate the brightness of the imaging region based on the luminance value of a visible light image. For example, the control unit 130 can evaluate the brightness of the imaging region by using an evaluative exposure metering scheme. For example, the control unit 130 can calculate the weighted load average of luminance values in a plurality of evaluative exposure metering frames provided in a visible light image as the luminance value of a visible light image. Alternatively, the control unit 130 may evaluate the brightness of an imaging region based on the illuminance of an object environment. For example, the control unit 130 can determine the illuminance of an object environment as the evaluation value of the brightness of a visible light image based on imaging information such as the gain setting and the stop value used by the imaging apparatus 100. Alternatively, the control unit 130 may evaluate the brightness of an imaging region based on the information obtained by a sensor (not shown) that measures the brightness of the imaging region.

The control unit 130 then determines whether the brightness of the imaging region is lower than the first threshold. If the control unit 130 determines that the brightness of the imaging region is not lower than the first threshold, the process returns to step S201, in which the imaging apparatus 100 continues the operation in the visible light mode. If the control unit 130 determines that the brightness of the imaging region is lower than the first threshold, the process advances to step S204. Note that the method of deciding the first threshold is not specifically limited. For example, the first threshold may be set in advance.

In step S204, the control unit 130 evaluates noise in the object in the imaging region. The control unit 130 may evaluate noise in an object in an imaging region based on a visible light image. The second evaluation unit (not shown) of the control unit 130 may perform this processing. For example, the control unit 130 can calculate a noise evaluation value indicating the smallness of noise in an object. A noise evaluation value decreases with an increase in noise amount with respect to a luminance value (signal amount) as in the case with the S/N ratio of a captured image. The type of noise evaluation value is not specifically limited. For example, the S/N ratio of an object region in a visible light image can be used as a noise evaluation value. Note that the control unit 130 may calculate a noise evaluation value based on a plurality of frames of a visible light image. In addition, in general, noise decreases with an increase in the brightness of an object, and hence the brightness of the object can be used as a noise evaluation value. In addition, in general, with a decrease in the amount of light passing through the optical unit 110, noise in an object increases. Accordingly, the control unit 130 may evaluate noise in an object based on imaging settings in the imaging apparatus 100, such as the stop value of the optical unit 110 and the zoom setting of the optical unit 110 which influences the stop value.

The control unit 130 can receive information designating the object subjected to noise evaluation in step S204. For example, the user may select an object subjected to noise evaluation via the client apparatus 190. A processing unit (not shown) of the imaging apparatus 100 or the client apparatus 190 may automatically detect an object subjected to noise evaluation by object detection processing based on a visible light image. For example, the control unit 130 can automatically detect a specific type of object such as the face or automobile by using a machine learning technique or the like. Note that the user may select an imaging region subjected to brightness evaluation in step S230 from an entire image or the control unit 130 or the client apparatus 190 may automatically set such an imaging region.

The control unit 130 then determines whether the noise evaluation value is equal to or more than the second threshold. If the noise evaluation value is equal to or more than the second threshold, the process advances to step S205, in which the imaging apparatus shifts from the visible light mode to the invisible light mode. If the noise evaluation value is less than the second threshold, the process advances to step S206, in which the imaging apparatus shifts from the visible light mode to the combination mode. Note that the method of deciding the second threshold is not specifically limited. For example, the second threshold may be set in advance. The second threshold may be constant regardless of the type of object or may be set in accordance with the object. For example, the second threshold may be set in accordance with the type of object selected. Such second threshold may be stored in the memory 150 in advance.

In the above case, the image sensors 121 and 122 continue synchronous capturing of a visible light image and an invisible light image regardless of the operation mode. However, in one embodiment, the image sensor 122 may start or end capturing an invisible light image in accordance with at least one of the brightness of an imaging region and noise in an object. For example, the image sensor 122 may stop capturing an invisible light image in the visible light mode using no invisible light image for an output operation, and may start capturing an invisible light image when the imaging apparatus 100 shifts to the invisible light mode or combination mode. In addition, when the image sensor 122 starts capturing an invisible light image, the illumination unit 160 may start emitting invisible light. When the image sensor 122 stops capturing an invisible light image, the illumination unit 160 may end emitting invisible light. This arrangement can reduce power consumption in the visible light mode.

The image processing unit 140 may start or end generating a combined image in accordance with at least one of the brightness of an imaging region and noise in an object. For example, the image processing unit 140 may stop generating a combined image in the visible light mode or invisible light mode or may start generating a combined image when the imaging apparatus 100 shifts to the combination mode. This arrangement can reduce the processing load on the imaging apparatus 100.

As described above, it is possible to evaluate the brightness of an imaging region and noise in an object based on a visible light image. In this case, the control unit 130 may evaluate the brightness of the imaging region and noise in the object by using a visible light image or a combined image generated based on a visible light image. That is, the control unit 130 may evaluate the brightness of the imaging region by using a visible light image or combined image. In addition, the control unit 130 may evaluate noise in the object by using a visible light image or combined image.

The relationship between the brightness of an imaging region, noise in an object, and the operation modes will be described next with reference to FIGS. 3A to 3C. FIG. 3A shows an imaging environment and a change in illuminance in the imaging environment. As shown in FIG. 3A, the imaging apparatus 100 images an imaging region in which objects 301 and 303 are present. The objects 301 and 303 are depicted in a visible light image 302. In this case, the user has selected the object 301 as a noise evaluation target and has not selected the object 303.

FIGS. 3B and 3C respectively show the relationships between brightness evaluation values 312, objects, and noise evaluation values in different cases. Referring to each of FIGS. 3B and 3C, the ordinate represents brightness evaluation value or noise evaluation value, and the abscissa represents time. A curve 311 represents the noise evaluation value of the object 301, and a curve 313 represents the noise evaluation value of the object 303. FIGS. 3B and 3C respectively show times 342 and 343 indicating operation mode changing timings.

As the time passes from day to night, the brightness evaluation value 312 gradually decreases. At time 342, the brightness evaluation value 312 is smaller than a first threshold 322. In the case shown in FIG. 3B, at time 342, the noise evaluation value of the object 301 selected by the user is smaller than a second threshold 321. For this reason, an operation mode 331 of the imaging apparatus 100 shifts from the visible light mode to the invisible light mode. In the case shown in FIG. 3C, at time 343, the noise evaluation value of the object 301 selected by the user is not smaller than the second threshold 321. For this reason, an operation mode 332 of the imaging apparatus 100 shifts from the visible light mode to the combination mode.

As described above, in this embodiment, the operation mode is changed based on the noise evaluation value. For example, if the noise evaluation value of the selected object is small, the imaging apparatus 100 does not shift to the combination mode but shifts from the visible light mode to the invisible light mode. This arrangement enables easy selection and setting of a proper operation mode from a plurality of operation modes including the invisible light mode. This can improve the recognizability of an object in an output image.

First Modification

Figure 4:
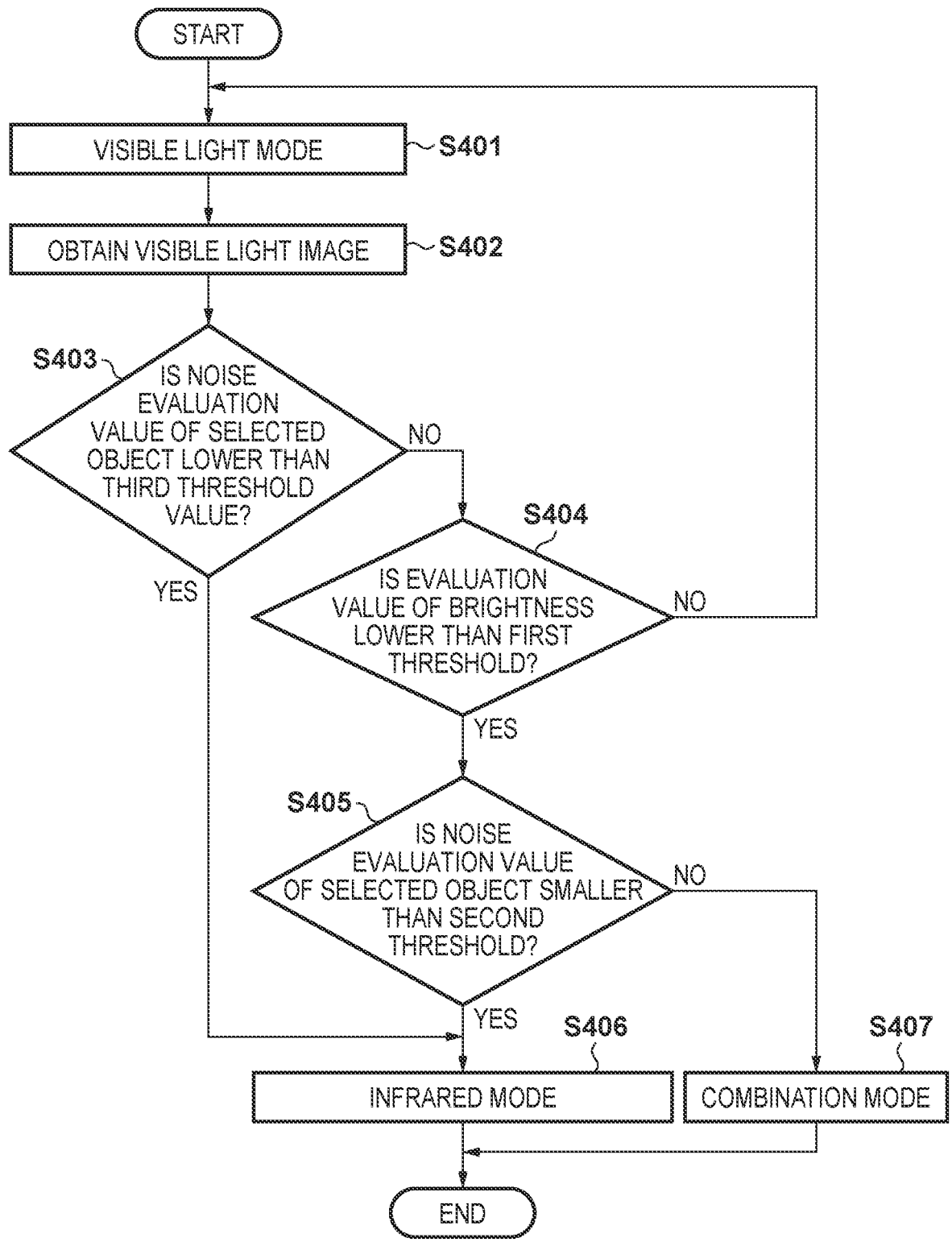
FIG. 4 is a flowchart showing an example of the operation mode changing processing.

The operation mode changing method is not limited to the above methods. For example, when the brightness of an imaging region is equal to or more than the first threshold, the control unit 130 may select and output a visible light image or invisible light image in accordance with noise in an object. Such a modification will be described with reference to FIGS. 4 to 6C. FIG. 4 is a flowchart for explaining a mode changing method according to this modification. The method complying with FIG. 4 is similar to the method complying with FIG. 2 except that step S403 is added. That is, steps S401 and S402 are similar to steps S201 and S202, and steps S404 to S407 are similar to steps S203 to S206. Descriptions of steps similar to those complying with FIG. 2 will be omitted hereinafter.

In step S403, the control unit 130 evaluates noise in the object in the imaging region based on the visible light image in a similar manner to that in step S204. The control unit 130 then determines whether a noise evaluation value indicating the smallness of the noise in the object is equal to or more than a third threshold. If the noise evaluation value is less than the third threshold, the control unit 130 outputs an invisible light image. That is, the imaging apparatus 100 shifts from the visible light mode to the invisible light mode. In contrast, if the noise evaluation value is equal to or more than the third threshold, the process advances to step S404.

In this modification, assuming that the brightness of an imaging region is equal to or more than the first threshold, if the noise evaluation value is smaller than the third threshold (YES in step S403), the invisible light mode is used, whereas if the noise evaluation value is larger than the third threshold (NO in step S404), the visible light mode is used. Assuming that the brightness of the imaging region is lower than the first threshold, if the noise evaluation value is smaller than the threshold (the second or third threshold), the invisible light mode is used; otherwise the visible light mode is used.

Note that the method of deciding the third threshold is not specifically limited. For example, the third threshold may be set in a similar manner to that for the second threshold. That is, the third threshold may be set in accordance with a selected object, and may be set in accordance with, for example, the type of object selected. In addition, the third threshold may be equal to or different from the second threshold. For example, the third threshold may be lower than the second threshold. Furthermore, the third threshold may be set for each type of object, while the second threshold is kept constant regardless of the type of object.

Figure 5A:
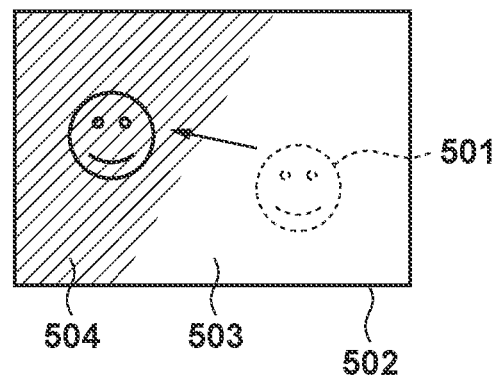
Figure 5B:
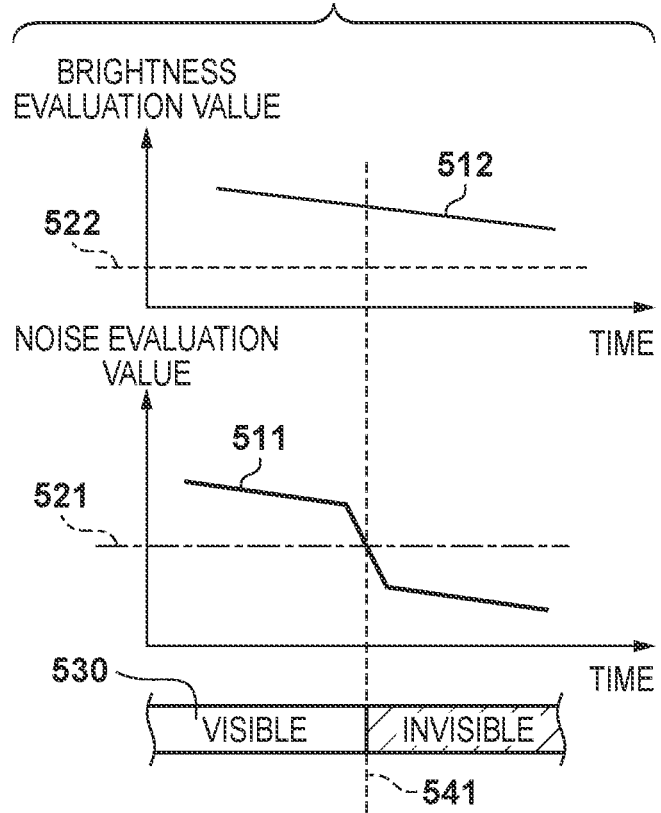

The relationship between the brightness of an imaging region, noise in an object, and the operation modes will be described next with reference to FIGS. 5A to 5D. FIGS. 5A and 5C show imaging environments and their changes. FIGS. 5B and 5D show the relationship between brightness evaluation values and noise evaluation values. Referring to each of FIGS. 5B and 5D, the ordinate represents brightness evaluation value or noise evaluation value, and the abscissa represents time. A curve 512 represents the brightness evaluation value of a visible light image 502. A curve 514 represents the brightness evaluation value of a visible light image 513. A threshold 522 is the first threshold. FIGS. 5A to 5D each show a state in which the brightness evaluation value is larger than the first threshold 522.

FIG. 5A shows a state in which an object 501 selected by the user moves from a bright region 503 to a dark region 504. Referring to FIG. 5B, a curve 511 represents a change in the noise evaluation value of the object 501 in the state shown in FIG. 5A. The noise evaluation value of the object 501 decreases as the object 501 moves to the dark region 504, and decreases below a third threshold 521 at time 541. Accordingly, an operation mode 530 of the imaging apparatus 100 shifts from the visible light mode to the invisible light mode at time 541. As described above, according to this modification, even when the brightness of an imaging region does not greatly decrease, the imaging apparatus 100 can output an invisible light image with small noise in accordance with an increase in noise in the object 501 as part of the imaging region.

FIG. 5C shows a state in which the user has selected one of different types of objects 506 and 507 as a noise evaluation target. The object 506 is the face of a person. The object 507 is a building. When identifying an object such as a person or face in an image, it may be easier to identify an object with a higher S/N ratio. When identifying an object such as a vehicle or building in an image, it may be easier to identify the object by referring to the color of the object. Although the illuminance of an imaging environment decreases with the lapse of time, the illumination is turned on to reduce a decrease in the brightness of the visible light image 513. In contrast, the illuminances of the selected objects 506 and 507 greatly decrease with the lapse of time.

FIG. 5D shows changes in the noise evaluation values of the objects 506 and 507 in the state shown in FIG. 5C. A curve 516 represents the noise evaluation value of the object 506, and a curve 517 represents the noise evaluation value of the object 507. In this case, a third threshold 526 is set for the object 506, and a third threshold 527 smaller than the third threshold 526 is set for the object 507. In this manner, the different third thresholds 526 and 527 are set for the objects 506 and 507.

When the user selects the object 506, the noise evaluation value of the object 506 becomes smaller than the third threshold 526 at time 542, and hence an operation mode 536 of the imaging apparatus 100 shifts from the visible light mode to the invisible light mode at time 542. In contrast, when the user selects the object 507, the noise evaluation value of the object 507 becomes smaller than the third threshold 527 at time 543, and hence an operation mode 537 of the imaging apparatus 100 shifts from the visible light mode to the invisible light mode at time 543. That is, in the state shown in FIG. 5C, the invisible light mode is used at an earlier timing when the object 506 is selected than when the object 507 is selected. In this modification, setting different third thresholds in accordance with objects makes it possible to change the timing of shifting to the invisible light mode in accordance with a selected object.

Second Modification

The method of evaluating noise in an object is not limited to the above method. For example, the control unit 130 can evaluate noise in an imaged object in consideration of the size of an image of the object. The control unit 130 then can select and output a combined image or invisible light image in consideration of the noise in the object which is evaluated in this manner. Alternatively, the control unit 130 can select and output a visible light image or invisible light image in consideration of the noise in the object which is evaluated in this manner. In other words, the control unit 130 can select and output a combined image or invisible light image or select and output a visible light image or invisible light image in consideration of the size of an image of an imaged object.

More specifically, the control unit 130 can calculate the noise evaluation value of an object 508 in consideration of the size of the object 508 on an image. For example, the control unit 130 may calculate a noise evaluation value such that the noise evaluation value to be calculated decreases with a decrease in the size of the object 508. For example, the control unit 130 can multiply the calculated noise evaluation value of the object 508 by a coefficient complying with the size information of the object. Otherwise, the control unit 130 may increase the second or third threshold with a decrease in the size of the object 508.

Figure 6C:
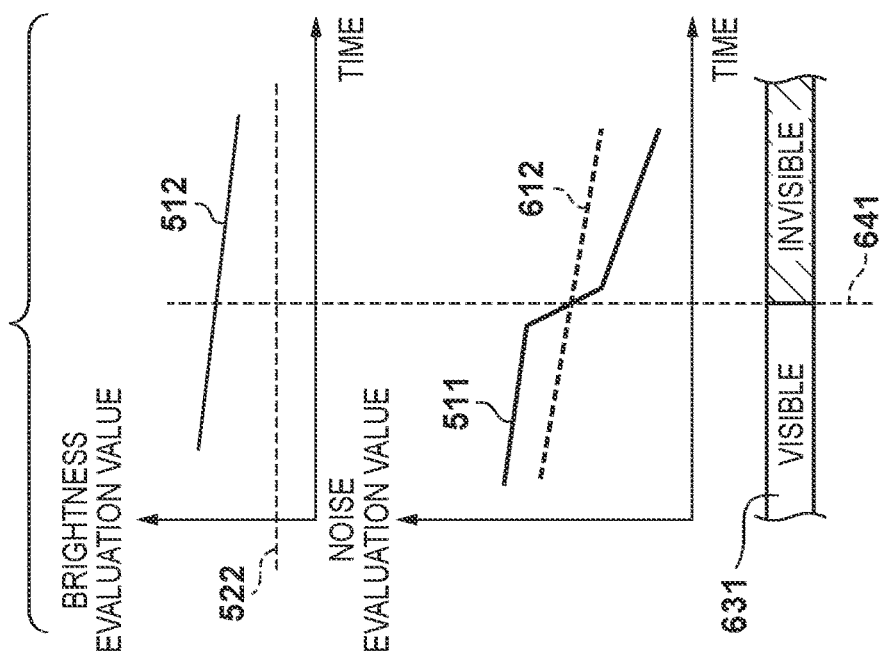
FIGS. 6A to 6C are schematic views for explaining the operation mode changing processing.
Figure 6B:
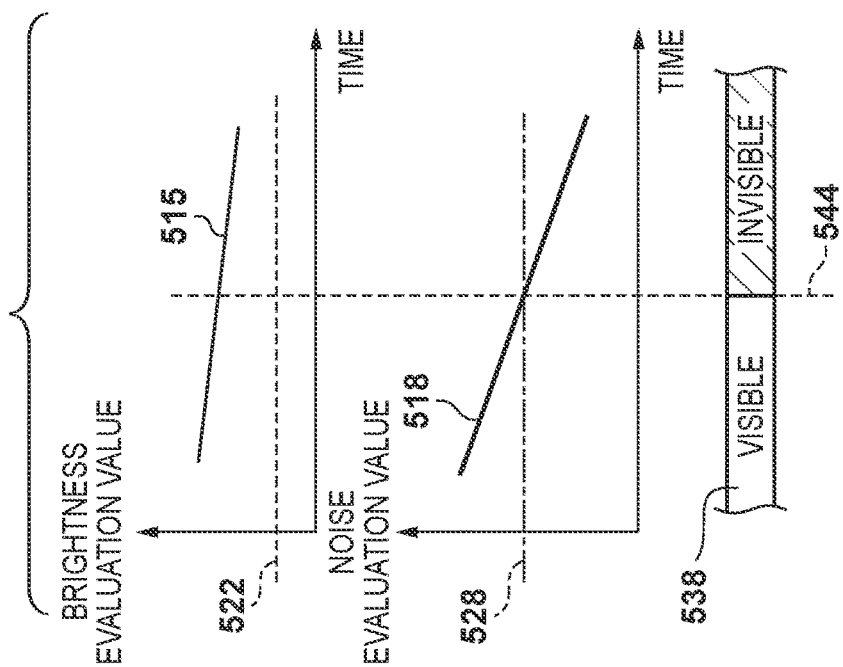
Figure 6A:
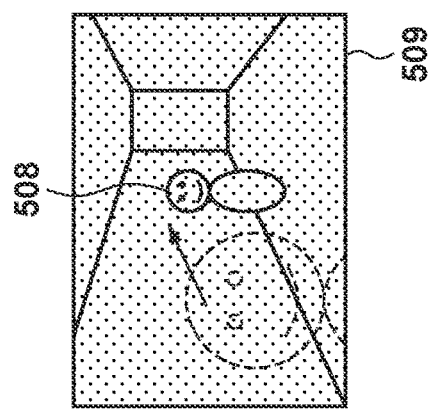

FIG. 6A shows a case in which the illuminance of an imaging environment hardly changes, and the size of an object region on a visible light image changes. FIG. 6B shows the relationship between brightness evaluation values and noise evaluation values as in FIG. 5B. A curve 515 represents the brightness evaluation value of a visible light image 509 and shows a state in which the brightness evaluation value is larger than the first threshold 522. As shown in FIG. 6A, the object 508 selected by the user is the face of a person, which decreases in size on the visible light image 509 because the object moves away from the imaging apparatus 100.

Referring to FIG. 6B, a curve 518 represents the noise evaluation value of the object 508. In this manner, the control unit 130 can calculate a noise evaluation value such that the noise evaluation value decreases as the object 508 goes apart from the imaging apparatus 100. Because the noise evaluation value of the object 508 becomes smaller than a third threshold 528 at time 544, the imaging apparatus 100 shifts from the visible light mode to the invisible light mode at time 544.

In another case, the control unit 130 can evaluate noise in an imaged object in consideration of the spatial frequency of an image of the imaged object. The control unit 130 can select and output a combined image or invisible light image or select and output a visible light image or invisible light image in consideration of the noise in the object evaluated in this manner. In other words, the control unit 130 can select and output a combined image or invisible light image or select and output a visible light image or invisible light image in consideration of the spatial frequency of the image of the imaged object. For example, the control unit 130 can calculate the noise evaluation value of a selected object such that the noise evaluation value decreases with an increase in the spatial frequency of the object. In addition, the control unit 130 can increase the second or third threshold with a decrease in the size of an object.

This arrangement quickens the shift from the visible light mode to the invisible light mode when an object is small or has a high spatial frequency. In general, the details of an image of a small object or an object having a spatial frequency tend to blur due to the influence of random noise at the time of low illuminance. The above arrangement can output an invisible light image with a high S/N ratio that allows easier identification of an object by quickening the timing of switching to the invisible light mode in accordance with the size or spatial frequency of the object.

Note that the control unit 130 may change the method of considering the size or spatial frequency of a selected object in accordance with the type of object. For example, the control unit 130 considers the size or spatial frequency of an object upon selection of an object such as a person or face, but need not consider the size or spatial frequency of an object upon selection of an object such as a vehicle or building.

Third Modification

The control unit 130 may set the third threshold based on an invisible light image. FIG. 6C shows the relationship between brightness evaluation values and noise evaluation values in the state shown in FIG. 5A in a similar manner to that in FIG. 5B. Referring to FIG. 6C, a curve 612 represents the noise evaluation value of the object 501 on an invisible light image. Because the object 501 moves to a dark region 504, the noise evaluation value of the object 501 on the visible light image decreases as indicated by the curve 511. On the other hand, owing to irradiation with infrared light, a change in the noise evaluation value of the object 501 on the invisible light image is small as indicated by the curve 612 as compared with a change in the noise evaluation value of the object 501 on the visible light image.

In this modification, the imaging apparatus 100 always captures a visible light image and an invisible light image. The control unit 130 calculates the noise evaluation value of the object 501 with respect to each of the visible light image and the invisible light image. The control unit 130 then sets the noise evaluation value of the selected object 501 on the invisible light image as the third threshold. In the case shown in FIG. 6C, the noise evaluation value of the visible light image becomes smaller than the noise evaluation value of the invisible light image at time 641. Accordingly, the imaging apparatus 100 shifts from the visible light mode to the invisible light mode at time 641.

Note that, as described above, the control unit 130 may determine the noise evaluation value of the object 501 on the combined image. Because a combined image is obtained from a visible light image and an invisible light image, the noise evaluation value of the combined image is greatly influenced by noise in the visible light image. For example, in the case shown in FIG. 6C, like the noise evaluation value of the visible light image, the noise evaluation value of the combined image becomes greatly smaller than that of the invisible light image. In this case, the imaging apparatus 100 can shift from the visible light mode to the invisible light mode when the noise evaluation value on the combined image of the selected object 501 becomes smaller than that on the invisible light image which is the third threshold. In this case, the imaging apparatus 100 can generate a combined image by always capturing a visible light image and an invisible light image.

The control unit 130 may set the second threshold by a similar method. For example, the control unit 130 may use the noise evaluation value of the object 501 on an invisible light image as the second threshold. Assuming that the brightness of an imaging region becomes lower than the first threshold in the visible light mode, if the noise evaluation value of the object 501 on the visible light image or combined image is less than the noise evaluation value of the object 501 on the invisible light image, the imaging apparatus 100 can shift to the invisible light mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-108226, filed Jun. 10, 2019, which is hereby incorporated by reference herein in its entirety.

What is claimed is:

1. An image processing apparatus comprising:
at least one processor; and
a memory coupled to the at least one processor and storing instructions that, when executed by the processor, cause the at least one processor to function as:
an obtaining unit configured to obtain a visible light image and an invisible light image of an imaging region;
a first evaluation unit configured to evaluate a brightness of the imaging region;
a second evaluation unit configured to evaluate noise in the imaging region;
a combining unit configured to generate a combined image by combining the visible light image and the invisible light image; and
an output unit configured to, in a case where the brightness becomes lower than a first threshold during an operation of outputting the visible light image:
output the combined image in a case where a noise evaluation value that is an evaluation result by the second evaluation unit is not less than a second threshold; and
output the invisible light image in a case where the noise evaluation value is less than the second threshold.

2. The apparatus according to claim 1, wherein the output unit is further configured to output either the visible light image or the invisible light image based on the noise evaluation value in a case where the brightness is not less than the first threshold during the operation of outputting the visible light image.

3. The apparatus according to claim 2, wherein the output unit is further configured to, in a case where the brightness is not less than the first threshold during the operation of outputting the visible light image:
output the visible light image in a case where the noise evaluation value that is the evaluation result by the second evaluation unit is not less than a third threshold; and
output the invisible light image if the noise evaluation value is less than the third threshold.

4. The apparatus according to claim 3, wherein the third threshold is set in accordance with a type of an object in the imaging region.

5. The apparatus according to claim 1, wherein the second evaluation unit is further configured to evaluate noise in the imaging region in consideration of a size of an image of an imaged object in the imaging region or a spatial frequency of the image of an imaged object in the imaging region.

6. The apparatus according to claim 1, wherein the second evaluation unit is further configured to obtain information designating an object in the imaging region.

7. The apparatus according to claim 1, wherein the first evaluation unit is further configured to evaluate the brightness by using the visible light image or the combined image, and the second evaluation unit is further configured to evaluate the noise by using the visible light image or the combined image.

8. The apparatus according to claim 1, wherein the combining unit is further configured to start or stop generation of the combined image in accordance with at least one of the brightness and the noise.

9. The apparatus according to claim 1, further comprising an imaging sensor configured to capture the visible light image and the invisible light image of the imaging region.

10. The apparatus according to claim 9, wherein the imaging sensor is further configured to start or stop capturing the invisible light image in accordance with at least one of the brightness and the noise.

11. The apparatus according to claim 9, further comprising
an irradiation light source configured to perform irradiation with invisible light,
wherein the irradiation with the invisible light is performed in accordance with at least one of the brightness and the noise.

12. An image processing method comprising:
obtaining a visible light image and an invisible light image of an imaging region;
evaluating a brightness of the imaging region;
evaluating noise in the imaging region;
generating a combined image by combining the visible light image and the invisible light image; and
in a case where the brightness becomes lower than a first threshold during an operation of outputting the visible light image;
outputting the combined image in a case where a noise evaluation value that is an evaluation result is not less than a second threshold; and
outputting the invisible light image in a case where the noise evaluation value is less than the second threshold.

13. The method according to claim 12, wherein the outputting includes outputting either the visible light image or the invisible light image based on the noise evaluation value in a case where the brightness is not less than the first threshold during the operation of outputting the visible light image.

14. The method according to claim 13, wherein the outputting includes, in a case where the brightness is not less than the first threshold during the operation of outputting the visible light image:
   outputting the visible light image in a case where the noise evaluation value that is the evaluation result is not less than a third threshold; and
outputting the invisible light image if the noise evaluation value is less than the third threshold.

15. The method according to claim 14, wherein the third threshold is set in accordance with a type of an object in the imaging region.

16. The method according to claim 12, wherein the evaluating the noise in the imaging region is performed in consideration of a size of an image of an imaged object in the imaging region or a spatial frequency of the image of an imaged object in the imaging region.

17. The method according to claim 12, further comprising obtaining information designating an object in the imaging region.

18. A non-transitory computer-readable medium storing a program which, when executed by a computer comprising a processor and a memory, causes the computer to perform:
   obtaining a visible light image and an invisible light image of an imaging region;
   evaluating a brightness of the imaging region;
   evaluating noise in the imaging region;
   generating a combined image by combining the visible light image and the invisible light image; and
   in a case where the brightness becomes lower than a first threshold during an operation of outputting the visible light image;
   outputting the combined image in a case where a noise evaluation value that is an evaluation result is not less than a second threshold; and
   outputting the invisible light image in a case where the noise evaluation value is less than the second threshold.

* * * * *